No. 862,324. PATENTED AUG. 6, 1907.
A. ENGLERTH.
CALCUMETER.
APPLICATION FILED DEC. 14, 1906.

3 SHEETS—SHEET 1.

Witnesses
N. C. DeLong
G. A. Adams

Inventor:
Anton Englerth,
per
Charles Turner Brown,
Attorney.

THE NORRIS PETERS CO., WASHINGTON, D. C.

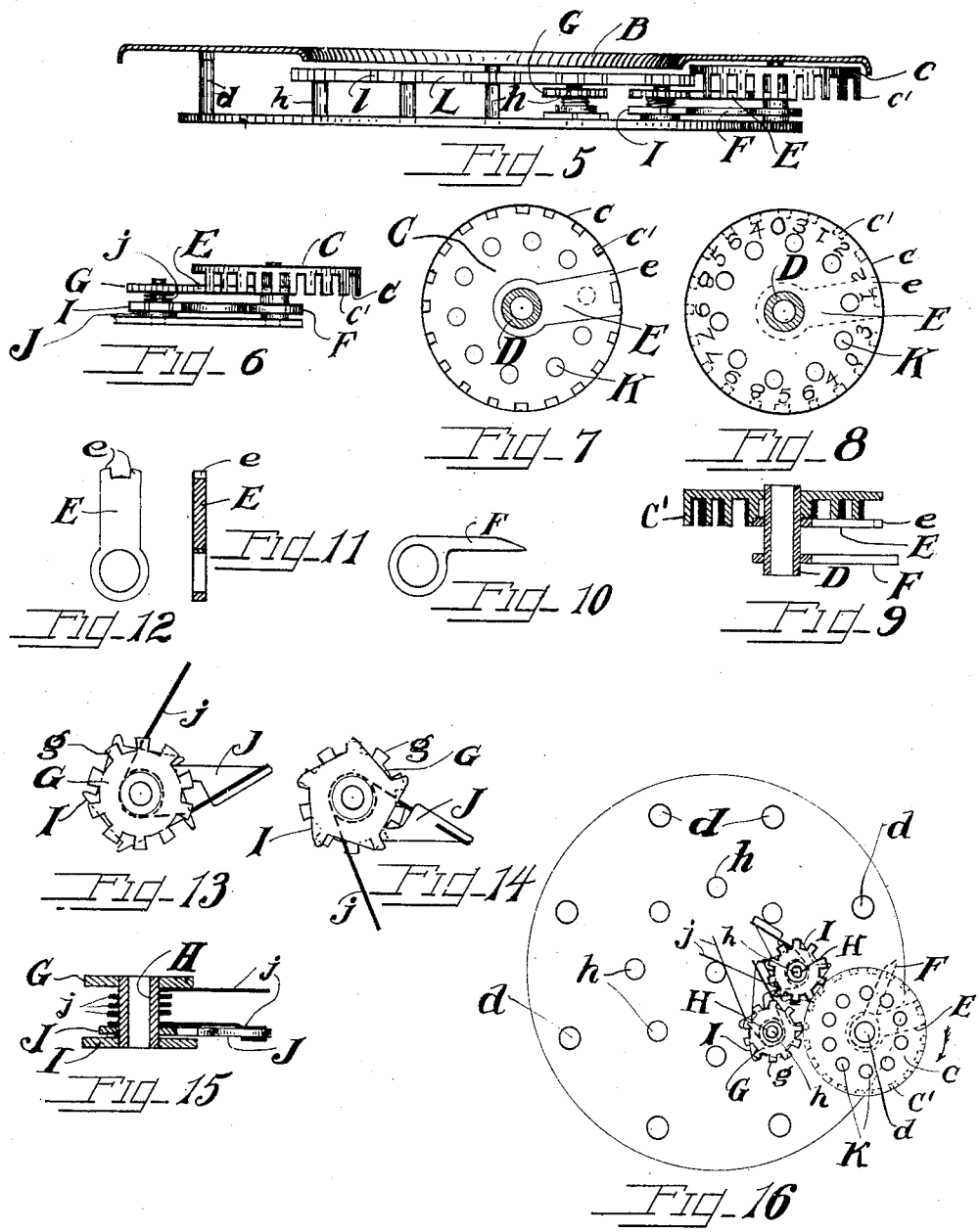

No. 862,324. PATENTED AUG. 6, 1907.
A. ENGLERTH.
CALCUMETER.
APPLICATION FILED DEC. 14, 1906.
3 SHEETS—SHEET 3.
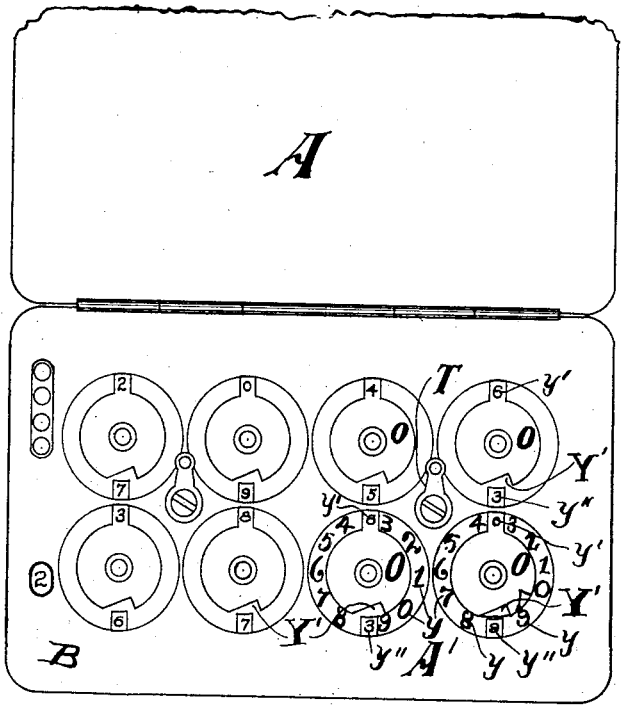
Fig. 17
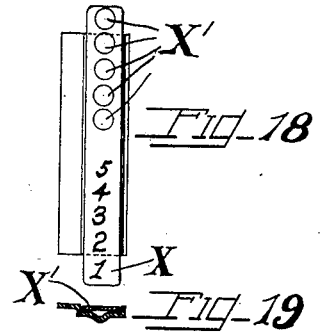
Fig. 18
Fig. 19
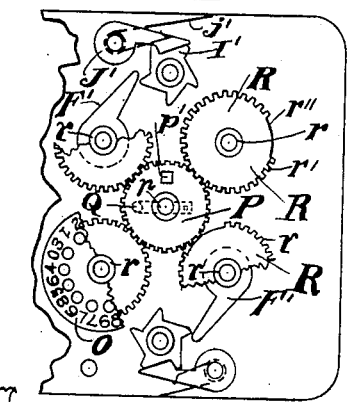
Fig. 20
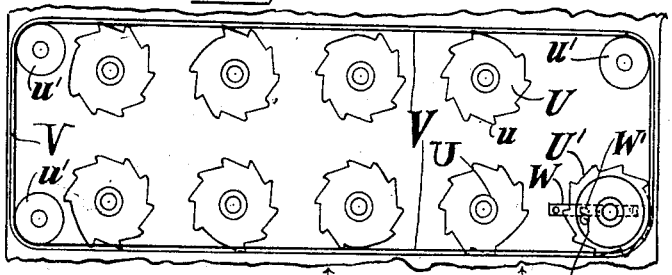
Fig. 24
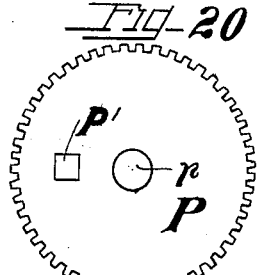
Fig. 21
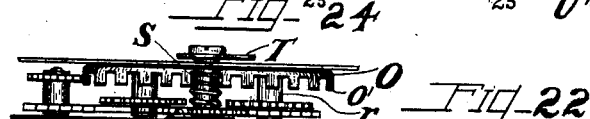
Fig. 22
Fig. 23
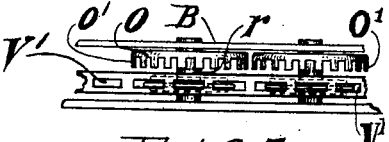
Fig. 25
Witnesses
H. C. De Long
G. A. Adams
Inventor
Anton Englerth,
per
Charles Turner Brown,
Attorney
THE NORRIS PETERS CO., WASHINGTON, D. C.

UNITED STATES PATENT OFFICE.

ANTON ENGLERTH, OF CHICAGO, ILLINOIS.

CALCUMETER.

No. 862,324.          Specification of Letters Patent.          Patented Aug. 6, 1907.

Application filed December 14, 1906. Serial No. 347,772.

*To all whom it may concern:*

Be it known that I, ANTON ENGLERTH, a citizen of Hungary, and a resident of Chicago, in the county of Cook and State of Illinois, have invented certain new and useful Improvements in Calcumeters, of which the following, when taken in connection with the drawings accompanying and forming a part hereof, is a full and complete specification, sufficient to enable those skilled in the art to which it pertains to understand, make, and use the same.

This invention relates to machines or devices by means of which, when the same are properly manipulated, a number of mathematical calculations may be made.

The object of the invention is to obtain a compact device, of light weight, of convenient form to be carried in the pocket, not liable to get out of order, durable; and a device which may be quickly and accurately operated.

A further object of this invention is to obtain a device of the character named wherein the several number indicating wheels may be mechanically "set" at or in their initial position, without the specific attention or observation of the operator being directed to each one of such indicating wheels.

Further objects of the invention are to obtain suitable grouping of the movable parts of the device and a minimum number of movable and stationary parts.

Figure 1:
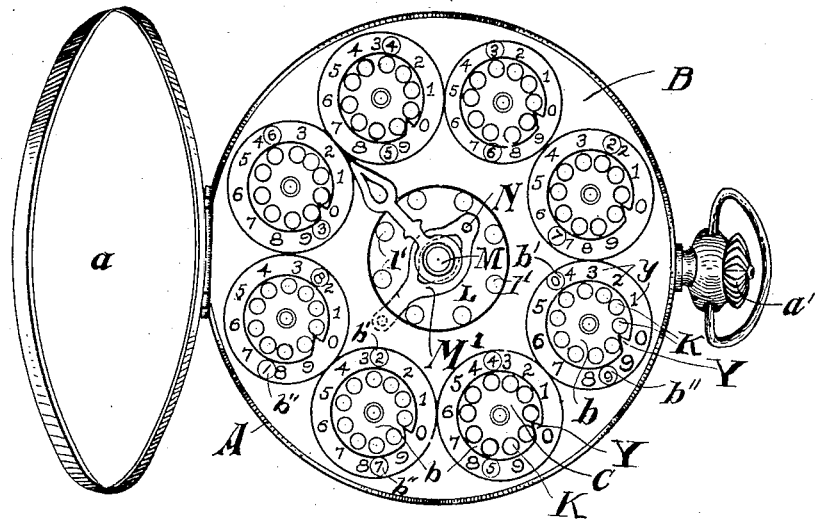
Figure 3:
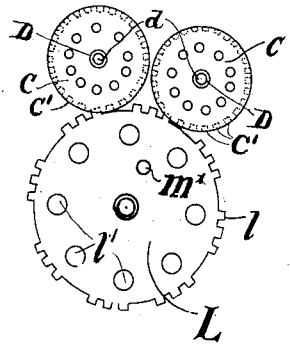
Figures 2, 4:
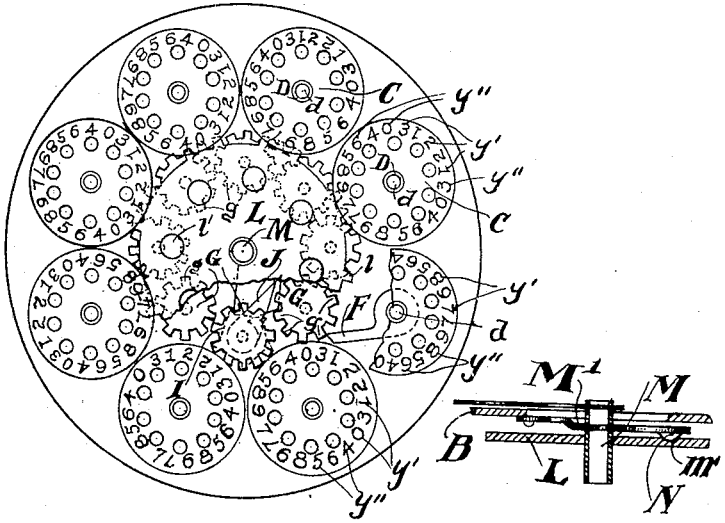

In the drawings referred to Figure 1 is a plan view of a calcumeter the construction whereof embodies this invention, with the cover of the case of the device open to expose to view the several indicating wheels and the dial of the device. Fig. 2 is a top plan view of the mechanism of the device illustrated in Fig. 1, with the dial removed to expose such mechanism to view and a portion of the "setting wheel" and one of the actuating wheels of the device also removed to expose to view the mechanism thereunder. Fig. 3 is a plan view of the setting wheel of the device, and of adjacent transmitting wheels. Fig. 4 is a sectional view of the setting wheel of the device, of the central post on which the setting wheel is mounted, and of the dial, showing a spring and an indicating hand in side elevation. Fig. 5 is a side elevation of the frame of the device, showing some of the movable parts thereof also in elevation, and showing the dial in section. Fig. 6 is an elevation of some of the movable parts of the device, including particularly one of the actuating wheels, (which in this construction is also an indicating wheel), an arm on the hub thereof turning therewith, and wheels termed by me transmitting wheels which are actuated by such arm. Fig. 7 is a bottom plan view of the actuating wheel illustrated in Fig. 6, and of the arm and teeth thereon by means of which motion is transmitted to the actuating wheel by a transmitting wheel forming an element in the device embodying the invention. Fig. 8 is a top plan view of the actuating wheel of the device. Fig. 9 is a vertical sectional view of the actuating wheel illustrated in Figs. 6, 7 and 8, respectively. Fig. 10 is a plan view of an arm one whereof is rigidly attached to each one of the several actuating wheels of the device except the end one thereof, (that is the one of highest denomination). Fig. 11 is a vertical sectional view of an arm which, in the construction of the device embodying this invention which is illustrated in Figs. 1 to 16, is rigidly attached to the actuating wheels of the device and is provided with gear teeth at the end thereof. Fig. 12 is a plan view of the arm illustrated in section in Fig. 11. Fig. 13 is a top plan view of a transmitting wheel intermeshing with one of the actuating wheels adjacent thereto, a ratchet wheel on the hub of the transmittting wheel attached to the hub to turn therewith, and a pawl which is, preferably, loosely mounted on the hub of the transmitting wheel, such transmitting wheel, ratchet and pawl forming elements of the device embodying this invention. Fig. 14 is a bottom plan view of the transmitting wheel, ratchet and pawl forming elements in a device embodying this invention, such parts being also illustrated in Figs. 13 and 15. Fig. 15 is a vertical sectional view of the transmitting wheel, ratchet and pawl forming elements in a device embodying this invention, such parts being also illustrated in Figs. 13 and 14. Fig. 16 is a plan view showing the base plate of the device embodying this invention which is illustrated in the preceding views, with an actuating wheel, transmitting wheels, and pawls, arranged in place to illustrate their relative position. Fig. 17 is a plan view of a modified construction of the device embodying this invention which is illustrated in Figs. 1 to 16 of the drawings. Fig. 18 is a plan view of an indicating plate and of the base thereof, forming elements in a device embodying this invention, when desired, such plate and base being shown on an enlarged scale from the view thereof in Fig. 17. Fig. 19 is a sectional view of the indicating plate and base illustrated in Fig. 18. Fig. 20 is a plan view of the operating wheels and movable parts at one end of the device which is illustrated in Fig. 17, with the dial plate removed to expose such wheels and parts to view. Fig. 21 is a plan view, on an enlarged scale, of the setting wheel of the device illustrated in Figs. 17 to 23, (both inclusive). Fig. 22 is an elevation of actuating wheels, transmitting wheels, the setting wheel and parts adjacent thereto which are elements in the modified construction illustrated in Fig. 17. Fig. 23 is an elevation of the actuating wheels, transmitting wheels, setting wheel and parts adjacent thereto which are illustrated in Figs. 20, 21 and 22, the setting wheel being shown in engagement with the gears adjacent thereto on the shafts of the actuating wheels. Fig. 24 is a further modification of the setting mechanism of a device embodying this invention: and Fig. 25 is an elevation of a portion of the setting mechanism illustrated in Fig. 24.

A reference letter applied to designate a given part is used to indicate such part throughout the several figures of the drawings, wherever the same appears.

A is a circular casing which is, preferably, provided with a cover $a$ and a pendant $a'$.

B is the dial of the device. Dial B is provided with the apertures $b, b, b$, through which contact may be made, as with a pencil or other like article, with the indicating wheels of the device. Such dial is also provided with apertures $b', b''$, through which numbers on the indicating wheels C may be observed.

C is an indicating wheel; and in the construction illustrated herein such wheel C is provided with the teeth $C', C'$, which are turned up therefrom, and thereby the indicating wheel is also made an actuating wheel.

D is the hub of wheel C.

E is an arm on hub D and $e, e$, are gear teeth on the outer end of arm E.

F is an arm on hub D.

Wheel C, arm E and arm F are all secured rigidly on the hub D to turn therewith.

$d$ is the post on which the hub D is rotatably mounted.

G is a transmitting wheel which is provided with teeth $g, g$, intermeshing with teeth $C', C'$, on wheel C and with teeth $e, e$, on arm E. It will be observed that the teeth $C', C'$, on wheel C do not extend entirely around the periphery of such wheel, and that the teeth $e, e$, on arm E are to supply the missing teeth $C', C'$; that is to say, teeth $C', C'$, and $e, e$, taken together supply a sufficient number of teeth to extend entirely around a wheel of the diameter of wheel C. and that thereby when wheel C is turned by transmitting wheel G through the intermeshing of teeth $g, g$, on such wheel G with the teeth $C', C'$, and $e, e$, such wheel C can be and is turned entirely around on its shaft or axle $d$.

H is a post forming an axle to transmitting wheel G and $h$ is the hub of such wheel.

I is a ratchet wheel secured to the hub ($h$) of transmitting wheel G to turn therewith.

J is a pawl arranged to turn loosely on the hub of one transmitting wheel and to engage with the teeth of ratchet I on an adjacent hub; and $j$ is a spring tending to hold pawl J in a given position, engaging with the teeth of the ratchet wheel corresponding thereto. The pawl J and ratchet I are of shape that the pawl holds the ratchet wheel, together with the hub ($h$) thereof and the transmitting wheel on the hub, in a determined position, and the spring $j$ is of sufficient tension to "set" the transmitting wheel at its determined position when such ratchet is turned, (as by arm F) to carry the point of the pawl over the point of one of the teeth of the ratchet; and the arm F which is secured to the hub of a given actuating wheel and pawl J which is mounted loosely on such hub are adjusted so that as such indicating wheel are turned completely round the combined effect of the arm and pawl is to turn the indicating wheel of next higher denomination, (by means of the transmitting wheel which moves in unison with the ratchet wheel), one tenth of a revolution.

In the operation of the device the arm F of any given actuating wheel is not in engagement with the ratchet operated or turned by such arm at any time except when the ratchet is actually moving, that is being turned, and hence by this construction any given actuating wheel may be turned at any time by placing the end of a pencil or other suitable instrument in the depressions or recesses K, K, thereon without turning the actuating wheel of next lower denomination, although the transmitting wheel to which motion is transmitted from an actuating wheel of next lower denomination thereto, as last above described, is thereby turned. For instance, confining the operation to the units and tens wheel: The arm F on the hub D of the units wheel turns with such wheel and when the units wheel is turned, as in adding, said arm F engages with the ratchet wheel I adjacent thereto to actuate such ratchet wheel, and the turning of the ratchet wheel turns the wheel G and such wheel G moves the tens counting wheel. The turning of the tens wheel turns said wheel G and said ratchet wheel I. When the arm F is not in motion it is not in engagement with the associated ratchet wheel I, hence the tens wheel may be moved in either direction, (thus moving the wheel G and said ratchet I), and not turn the arm F or the hub D to which such arm is secured.

To set the several combined actuating and indicating wheels C, C, in their respective initial position I provide the setting wheel L rotatably mounted on post M so that the teeth $l, l, l$, thereon will engage with teeth $C', C'$, on wheel C, and I provide recesses $l', l'$, on such wheel L so that it may be turned around its axle by means of a pencil or other suitable instrument inserted in recesses $m, m$.

Where the setting wheel L is turned to bring the several actuating and indicating wheels C, C, to their initial position the teeth $l, l$, will turn such wheels until the zero and the figure 9 on such turned wheel is exposed to view through the respective apertures therefor in the dial of the device. At such time the portion of the periphery of wheels C, C, whereon there are no teeth, will be adjacent to the setting wheel, and further turning of the setting wheel will not turn the wheel which has been set thereby to its initial position. In this manner the setting wheel is turned until all the combined actuating and indicating wheels have been set to their respective initial positions.

The teeth are omitted on a portion of the setting wheel L so that when such setting wheel is in position so that the portions thereof on which there are no teeth are adjacent to the several combined actuating and indicating wheels C, C, such wheels C, C, may be turned in the operation of the device without turning the setting wheel, and the operation of the device is the same as if such setting wheel were not in the machine. To insure the desired position of the setting wheel I provide spring N and secure it to the under side of the dial B, and place button N on such spring, with a recess on the upper face of the setting wheel, ($m'$, Fig. 4), into which such button extends when the setting wheel is brought around to its proper position for the wheels C, C, to be operated.

In the construction illustrated in Figs. 1 to 16 the several actuating wheels and transmitting wheels are respectively mounted on posts concentrically grouped around the post on which setting wheels L is rotatably mounted.

As I do not desire to be confined to the use of a setting wheel whereon the gear teeth are grouped in series, as in the construction illustrated in Fig. 1 to 16, I have made other setting devices which I have illustrated and will presently describe, by means of which the several actuating wheels may be set to their initial positions, respectively, while, when such wheels are once "set" no movement of the setting wheel is effected by the movement of the actuating wheels in the operation of the device.

In the modification illustrated in Figs. 17 to 23, both inclusive, arm F′ is similar to arm F, ratchet wheel I′ is similar to ratchet wheel I. Springs j′ are similar to springs j, and pawl J′ is similar to pawl J. In this modification the indicating wheels O, O, are set up in two groups, relative to the setting wheel. By this means the case A′ may be made square, or rectangular. Two setting wheels are required, one for each group of indicating wheels. One group of indicating wheels is shown in Fig. 20 with one setting wheel, (P). R is a gear wheel secured on hub r of indicating wheel O, and r′ are the teeth on wheel R. A portion of the periphery of wheel R is toothless as at r″, Fig. 20. Wheel O is provided with teeth O′ (Figs. 21, 23 and 25), extending entirely around the periphery thereof. Setting wheel P turns on post p and is provided with the aperture P′. Q, (Figs. 22 and 23), is a button attached to the base of the device so that when the setting wheel is in position with the button Q in aperture P′ the setting wheel is down, out of engagement with the teeth on the several gear wheels R, and when such setting wheel is turned so that the button is out of the aperture such wheel is raised into engagement with wheel R, R. Turning of the setting wheel P will turn wheels R, R, respectively, until the portion r″ of the periphery of such wheels which has no teeth thereon is opposite or adjacent to the setting wheel, and at such time the wheels O, O, are in their initial position.

S is a spring, tending to hold the setting wheel P in the position thereof illustrated in Fig. 22 and out of operative position. T is a hand which turns freely on post p. Hand T is used to indicate the one of the combined indicating and actuating wheels which should be next used in the operation of the machine to add or subtract a number or series of numbers of several denominations.

Y, Y, (Figs. 1 and 16), are inwardly extending projections on the edge of the large apertures in the dial (like projections are to be found in all the constructions shown,) which may be termed fingers. These fingers Y, Y, respectively limit the forward movement of the combined indicating and actuating wheels when a pencil or other instrument is placed in any one of the recesses K, K, (Figs. 1 to 16), and such wheel is turned from left to right. By making the recesses K, K, and providing the finger Y to such combined indicating and actuating wheel such wheels may, respectively, be turned a determined portion of a revolution thereby adding or substracting a determined number and causing the same to be indicated or registered by the device.

y, y, (Fig. 1), are figures on the dial of the device around the apertures through which the combined indicating and actuating wheels are viewed and actuated and y′, y″ are the figures on the face of the indicating and actuating wheels C (Fig. 1). Like figures are to be found on wheel O (see Fig. 17).

In Figs. 24 and 25 a third manner of setting the indicating wheels of the device to an initial position is shown. In this modification the ratchet wheels U, U, having teeth u, u, are rigidly secured on the hub of the respective combined indicating and actuating wheels; and additional ratchet wheel U′ having its teeth set in the opposite direction to the teeth u, u, is rotatably mounted in the case of the device, and ribbon V is movably mounted on wheel U′ and wheels u′, u′, u′, so that such ribbon may be turned by turning the wheel U. Ribbon V is provided with aperture V′, V′, and the ends of the ratchet teeth u, u, on ratchet U, U, are in the several apertures adjacent thereto, so that as the ribbon is moved by ratchet U′ the ratchet teeth u, u, are engaged by the ribbon V and the ratchet wheels U, U, are turned to set the device. It will be seen that one tooth is omitted from ratchet wheels U, U, so that when the device is properly set further movement of the ribbon V will not move the ratchet wheels.

W is a spring provided with button W′ to engage with recess U″ on wheel U′ to indicate when the wheel U′ is in proper position so that the ratchet wheels may be turned without turning the ribbon V or moving it.

X, (Figs. 17, 18 and 19), is a sliding plate provided with numbers thereon and with recesses X′, X′ which is moved to indicate the actuating wheel which should be next moved in the operation of the device.

Having thus described my invention what I claim is new and desire to secure by Letters Patent is;—

1. In a calcumeter, the combination of a central post, a series of posts grouped around the central post, a setting wheel rotatably mounted on the central post and indicating wheels rotatably mounted on the series of posts, an additional series of posts grouped around the central hubs rotatably mounted on the posts of the additional series, transmitting wheels and ratchet wheels secured on the hubs to turn therewith, respectively, pawls loosely mounted on the hubs, the pawl on one hub arranged to engaged with the ratchet on the hub of an adjacent post, springs yieldingly holding the pawls in engagement with the corresponding ratchet, gears to the setting wheel and gears to the indicating wheels, respectively, with a portion of the periphery of the indicating wheel gears toothless, means to engage the gears to the setting wheel with the gears to the indicating wheels a portion of the time during which the setting wheel is being turned, the transmitting wheels, the ratchet wheels and the indicating wheels arranged so that a ratchet wheel is actuated by the revolution of an indicating wheel adjacent thereto and the transmitting wheel on the hub of an actuated ratchet wheel will move an indicating wheel of next higher denomination a determined portion of a revolution ; substantially as described.

2. In a calcumeter, the combination of a central post, a series of posts grouped around the central post, a setting wheel rotatably mounted on the central post and indicating wheels rotatably mounted on the respective additional posts, all of such wheels provided with gears, the gears of the indicating wheels arranged to intermesh with the gear of the setting wheel, with a portion of the gears of the respective indicating wheels toothless, and means to engage the gears of the setting wheel with the gears of the indicating wheels a portion of the time during which the setting wheel is being turned ; substantially as described.

3. A dial provided with apertures therein, a series of transmitting wheels on rotatably mounted hubs, such transmitting wheels respectively provided with gear teeth, a setting wheel rotatably mounted at a point central to the several rotatably mounted hubs, in combination with a plurality of rotatably mounted hubs and indicating wheels provided with gear teeth, the gear teeth on a given hub and wheel arranged to co-act with the gear teeth on the setting wheel and on an adjacent transmitting wheel, indicating marks on the face of the indicating wheels, pawls, ratchet wheels on the hubs of the transmitting wheels, springs yieldingly holding the pawls in engagement with the teeth of the ratchet wheels, such pawls and the teeth of the ratchet wheels so related as to yieldingly hold the indicating wheels in position to expose a determined indicating mark thereon to view through determined apertures in the dial, an arm on the hub of the respective indicating wheels arranged to engage with the teeth of a ratchet wheel to actuate it and turn the transmitting wheel thereof; substantially as described.

4. A transmitting wheel provided with gear teeth and a setting wheel provided with gear teeth, a rotatably mounted indicating wheel and hub provided with gear teeth co-acting with the gear teeth on the transmitting wheel and with the gear teeth on the setting wheel, such gear teeth arranged so that rotation of the transmitting wheel rotates the indicating wheel, rotation of the setting wheel turns the indicating wheel to a determined position, and rotation of the indicating wheel rotates the setting wheel only when the setting wheel is in a determined position with the gear teeth thereon in engagement with gear teeth of the indicating wheel and hub, and means to actuate a transmitting wheel engaging with a given indicating wheel on the complete revolution of an indicating wheel of next lower denomination, substantially as described.

5. A transmitting wheel provided with gear teeth and a setting wheel provided with gear teeth, a rotatably mounted indicating wheel and hub provided with gear teeth co-acting with the gear teeth on the transmitting wheel and with the gear teeth on the setting wheel, such gear teeth arranged so that rotation of the transmitting wheel rotates the indicating wheel, and rotation of the setting wheel turns the indicating wheel to a determined position, and rotation of the indicating wheel rotates the setting wheel only when the setting wheel is in a determined position with the gear teeth thereon in engagement with gear teeth of the indicating wheel and hub; substantially as described.

6. A transmitting wheel provided with gear teeth and a setting wheel provided with gear teeth, in combination with a rotatably mounted hub and indicating wheel, such hub and wheel provided with gear teeth coacting with the gear teeth on the transmitting wheel and on the setting wheel, such gear teeth arranged so that rotation of the transmitting wheel rotates the indicating wheel and rotation of the setting wheel turns the indicating wheel to a determined position, with the gear teeth thereof out of engagement with the gear teeth of the setting wheel, substantially as described.

7. A setting wheel provided with a series of depressions thereon, an indicating wheel provided with a series of indicating marks on the face thereof running from left to right and provided with an additional series of indicating marks running from right to left, and also provided with a series of depressions on the face thereof concentric with both series of indicating marks, and a dial provided with a plurality of apertures therethrough, one of such apertures concentric to the series of depressions on the setting wheel and one of such apertures concentric to the series of indicating marks on the indicating wheel, an inwardly extending finger on the peripheral edge of the aperture through which the indicating wheel is exposed to view, such dial and indicating wheel arranged so that one of the indicating marks of one of the series on the wheel is exposed to view through one of the apertures in the dial and one of the indicating marks of the other series is exposed to view through another one of the apertures in the dial, and such dial provided with a series of indicating marks arranged concentric to the indicating wheel; substantially as described.

8. An indicating wheel provided with a series of indicating marks on the face thereof running from left to right and with an additional series of indicating marks running from right to left, and also provided with a series of depressions on the face thereof, in combination with a dial provided with a plurality of apertures therethrough and also provided with a series of indicating marks concentric to one of the apertures, a projecting finger on the dial to prevent complete revolution of the indicating wheel by an instrument inserted in any one of the depressions on the face of such wheel, such dial and indicating wheel arranged so that the indicating marks on one series on the face of the indicating wheel are exposed to view through one of the apertures in the dial and the indicating marks of the other series on the indicating wheel are exposed to view through another aperture in the dial; substantially as described.

9. An indicating wheel provided with a series of gear teeth depending from a lower side thereof and provided with additional gear teeth, such additional gear teeth extending a portion of the way around the circumference of a circle, and such indicating wheel provided with a series of indicating marks on the face thereof running from left to right and with an additional series running from right to left, in combination with a dial provided with apertures therethrough and with a series of indicating marks concentric to one of the apertures, such dial and indicating wheel arranged so that the indicating marks of one series on the face of the indicating wheel are exposed to view through one of the apertures in the dial and the indicating marks of the other series on the indicating wheel are exposed to view through the remaining aperture in the dial; substantially as described.

10. A rotatably mounted indicating wheel, a gear to the indicating wheel with a portion of the periphery thereof toothless, additional gear teeth to the indicating wheel in a different plane from the one in which the first named gear teeth are placed, a transmitting wheel and a setting wheel provided, respectively, with gears, the gears of the transmitting wheel arranged to continuously intermesh with gear teeth of an indicating wheel and the gears of the setting wheel arranged to intermesh with the gear of the indicating wheel whereof a portion of the periphery is toothless, and means to engage the gear of the setting wheel with such gear when the setting wheel is being turned; substantially as described.

11. An indicating wheel provided with a series of gear teeth depending from the lower side thereof and provided with additional gear teeth, such additional gear teeth extending a portion of the way around the circumference of a circle, and such indicating wheel provided with a series of indicating marks on the face thereof running from left to right and with an additional series running from right to left; substantially as described.

ANTON ENGLERTH.

In the presence of—
CARL A. RAMIG,
BERNARD J. MAHONY.